United States Patent [19]

Maier et al.

[11] Patent Number: 5,076,977
[45] Date of Patent: Dec. 31, 1991

[54] PROCESS FOR CONTROLLING CURL IN POLYESTER FILM

[75] Inventors: Larry K. Maier, Rochester; Michael J. Moszkowicz, Fairport; Thomas M. Laney, Spencerport, all of N.Y.

[73] Assignee: Eastman Kodak Company, Rochester, N.Y.

[21] Appl. No.: 463,179

[22] Filed: Jan. 10, 1990

[51] Int. Cl.$^5$ .............................. B29C 35/10
[52] U.S. Cl. .................. 264/25; 264/210.5; 264/235.8; 264/327
[58] Field of Search .............. 264/210.5, 288.4, 235.6, 264/327, 25, 288.8, 290.2, 235.8

[56] References Cited

U.S. PATENT DOCUMENTS

| | | | |
|---|---|---|---|
| 2,851,733 | 9/1958 | Pangonis et al. | 18/48 |
| 2,968,067 | 1/1961 | Long | 18/48 |
| 3,161,711 | 12/1964 | Tassler | 264/289 |
| 3,375,313 | 3/1968 | Zygan et al. | 264/289 |
| 3,429,961 | 2/1969 | Spencer | 264/289 |
| 3,632,726 | 1/1972 | Knox et al. | 264/230 |
| 3,676,539 | 7/1972 | Fisher | 264/175 |
| 3,796,785 | 3/1974 | Rest et al. | 264/288 |
| 3,816,886 | 6/1974 | Van Cappellen | 26/68 |
| 4,093,695 | 6/1978 | Heirbaut | 264/235.6 |
| 4,141,735 | 2/1979 | Schrader et al. | 96/75 |
| 4,165,356 | 8/1979 | Heider | 264/519 |
| 4,230,658 | 10/1980 | Matsukura et al. | 264/235.8 |
| 4,293,508 | 10/1981 | Heirbaut et al. | 264/25 |
| 4,370,291 | 1/1983 | Kazama et al. | 264/210.7 |
| 4,497,865 | 2/1985 | Minami et al. | 428/336 |
| 4,587,071 | 5/1980 | Minami et al. | 264/210.7 |
| 4,617,164 | 10/1986 | Kanesaki et al. | 264/235.8 |
| 4,892,689 | 1/1990 | Van Cappellen et al. | 264/210.5 |
| 4,994,214 | 2/1991 | Stevens et al. | 264/210.7 |

FOREIGN PATENT DOCUMENTS

| | | | |
|---|---|---|---|
| 954680 | 9/1974 | Canada . | |
| 0299560 | 1/1989 | European Pat. Off. . | |
| 48-14780 | 5/1973 | Japan | 264/288.4 |
| 62-87320 | 4/1987 | Japan | 264/288.4 |
| 131550 | 5/1989 | Japan . | |
| 887346 | 1/1962 | United Kingdom | 264/288.4 |
| 1030288 | 5/1965 | United Kingdom . | |
| 1185353 | 3/1970 | United Kingdom . | |

*Primary Examiner*—Jeffery Thurlow
*Attorney, Agent, or Firm*—Charles E. Snee

[57] ABSTRACT

A process for controlling curl in polyester film is disclosed in which a cost sheet is heated assymetrically across its thickness during longitudinal stretching to product positive, negative or zero curl, as required for subsequent uses or treatments of the film formed by such stretching.

10 Claims, 3 Drawing Sheets

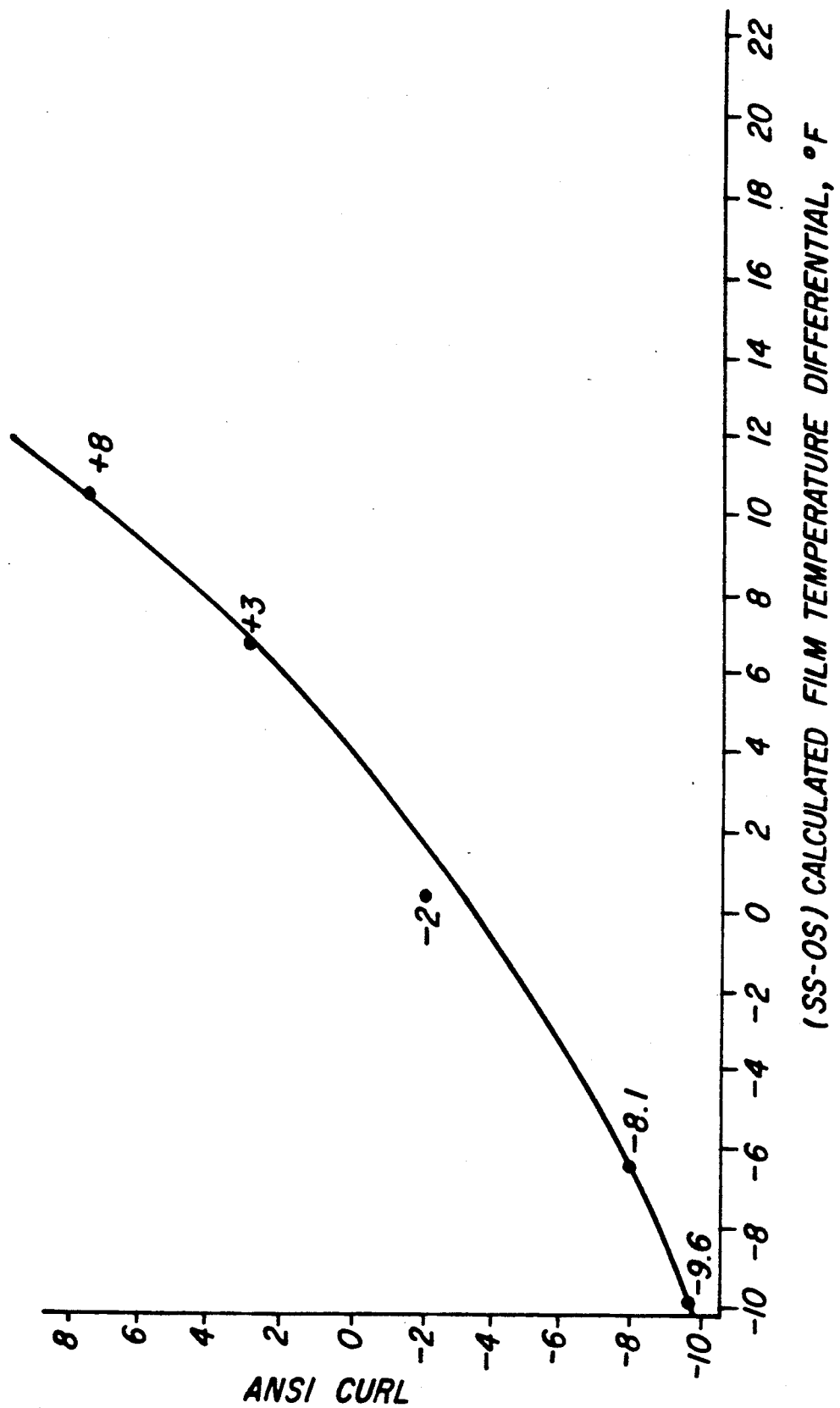

PROCESS FOR CONTROLLING CURL IN POLYESTER FILM

TECHNICAL FIELD

The present invention concerns an improved process for controlling curl in polyester film. More particularly, the invention concerns the production of such films for use in photographic products for which a high degree of flatness is desired in the finished product.

BACKGROUND ART

For many years it has been known to biaxially stretch or molecularly orient webs of thermoplastic materials both to produce films of desired thickness and also to improve the mechanical and dimensional properties of the film. Examples of equipment used for such stretching or orienting are found in U.S. Pat. Nos. 3,375,313 and 3,676,539. Certain usually undesirable characteristics of such stretched films have been observed over the years, such as the tendency of some films to acquire a set curvature in the longitudinal direction following winding onto a core or spool, a phenomenon known as core-set as discussed at length in U.S. Pat. No. 4,141,735. Such films also frequently exhibit a tendency to curl in their longitudinal direction or to camber transversely, depending on the particular thermoplastic material used and the process used for biaxial stretching.

A variety of techniques have been developed in efforts to minimize or at least control core set, longitudinal curl and transverse camber. British Patent 1,030,288 discloses a method for making polymeric strap in which it is recognized that differential heating of a film during stretching and differential cooling of the film following stretching can contribute to camber and core set. U.S. Pat. No. 3,429,961 discusses a process for improving the uniformity of several film properties in which a temperature profile is established across the transverse width of the film just prior to initial stretching; so that, following initial stretching, the film has convex upper and lower surfaces. Stretching in the perpendicular direction to the initial stretch then produces a flat film having more uniform properties. U.S. Pat. No. 3,632,726 discloses an apparatus and method for making dimensionally stable plastic film, in which a previously oriented film is moved on cushions of air between a heat source and a heat sink, thereby producing a film of improved flatness.

In U.S. Pat. No. 3,796,785, heated feed and delivery rollers are described which rotate about parallel axes, with the temperature of the feed roller being below the softening temperature of the unstretched material and the temperature of the faster rotating delivery roller being below the softening temperature of the stretched material but well above the softening temperature of the unstretched material. The arrangement causes stretching of the material in a narrow gap between the rolls and is said to ensure films of more uniform thickness. U.S. Pat. No. 3,816,886 discloses an apparatus for longitudinally stretching thermoplastic film in which the film is drawn under stretching tension over a first, heated roller and then over a second, cooled roller very closely adjacent the first roller, while infrared heat is applied to the film between the rollers to facilitate stretching. Canadian Patent 954,680 discloses an apparatus for production of crimped filaments of plastic film in which a film under stretching tension is passed between rollers having different temperatures; so that, there is a temperature gradient across the thickness of the film while it is passing through the nip of the rollers. The patentee claims that the molecular orientation of one surface of the web thus is modified by the rollers to a different extent than the orientation of the other surface, as the web is stretched at or near the nip of the rollers.

U.S. Pat. No. 4,165,356 discloses a method and apparatus for forming tubular plastic material in which an extruded tube is subjected to cool air flow through its interior and warmer air flow over its exterior during longitudinal and circumferential stretching. The temperature differential is said to cause the edges of the tube to flare outwardly upon severance. U.S. Pat. No. 4,293,508 describes an apparatus for longitudinally stretching polyethylene terephthalate film in which heating of the film during stretching is carried out in two stages, an initial infrared preheating and a final, concentrated infrared heating to a temperature suitable for elongation, leading to a film said to have improved flatness and surface quality.

While processes and apparatus of the types disclosed in such patents have contributed to the ability of those skilled in the art to produce biaxially oriented films with significantly improved characteristics, a need has continued to exist for a reliable process for controlling curl in films made from thermoplastic material. Particularly in processes in which the film is produced by stretching a substantially flat sheet having beaded edges, the ability to produce films having a desired degree of curl has been difficult to achieve.

SUMMARY OF THE INVENTION

The primary objective of the present invention is to provide an improved process for producing film from thermoplastic material, in which the degree of curl in the finished film can be controlled within desired limits.

A further objective of the invention is to provide such a process which can be applied to known types of film stretching equipment without requiring substantial modification of the equipment.

These objectives are given only by way of illustrative examples; thus, other desirable objectives and advantages inherently achieved by the disclosed invention may occur or become apparent to those skilled in the art. Nonetheless, the scope of the invention is to be limited only by the appended claims.

According to the process of the invention, molecularly oriented films of thermoplastic materials may be made which have a desired amount of longitudinal curl. The molten material is extruded through a flat die to produce a cast sheet which then preferably is cooled to below its glass transition temperature to facilitate further handling. The sheet is pulled through a preheating zone in which its temperature is increased to a level insufficient for plastic elongation to occur, after which the sheet passes into a longitudinal stretching zone where it is stretched in the direction of its movement while it is further heated to a temperature above its glass transition temperature but below its crystallization temperature. In accordance with the invention, such further heating is performed assymetrically so that during stretching a temperature exists across the thickness of the sheet from one surface to the other. Following such stretching, the resultant oriented film is cooled to a temperature below its glass transition temperature to prevent further longitudinal stretching. Typically, the film is then preheated again, subjected to transverse stretching and conveyed to a heat setting zone where its temperature is raised to approximately its crystallization temperature for a time sufficient to complete the crystallization process.

The assymetric heating of the cast sheet during stretching may be accomplished in any convenient manner, such as by directing a flow of heated air at one or both surfaces of the sheet, by applying infrared heat to one or both surfaces or by a combination of the two. Preferably, the temperature of each surface of the cast sheet during stretching is in the range from the glass transition temperature to the crystallization temperature of the material. Preferably the stretching of the material is accomplished by passing the cast sheet through a first set of pull rolls rotating at a first velocity and then through a second set of pull rolls rotating at a second, higher velocity; so that, the stretching and assymetric heating of the material occur between the first and second sets of pull rolls.

The process of the invention is particularly well suited for biaxially stretching polyethylene terephthalate and its copolymers. However, other thermoplastic orientable materials also may be treated in accordance with the process of the invention. Any polymer such as a polyester may be used which is capable of being cast into a sheet or film, spun into fibers, extruded into rods or blow molded into containers, for example. Such polyesters should have a glass transition temperature between about 50 degrees and 150 degrees Centigrade, preferably about 60 to 100 degrees Centigrade, should be orientable, and have an inherent viscosity of at least 0.55 dl/gm, preferably 0.6 to 0.9 dl/gm. Suitable polyesters include those manufactured from aromatic, aliphatic or cycloaliphatic dicarboxylic acids of 4 to 20 carbon atoms and aliphatic or alicyclic glycols having from 2 to 24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexane-dicarboxylic, sodium-sulfoisophthalic and mixtures thereof. Examples of suitable glycols include ethylene glycol, polyethylene glycol, propylene glycol, butanediol, pentanediol, hexanediol, 1,4-cyclohexanedimethanol diethylene glycol, and mixtures thereof. Suitable polyesters are well known and may be produced by well known techniques, such as those described in U.S. Pat. Nos. 2,465,319 and 2,901,466. Preferred polymers are those having repeat units from terephthalic acid or naphthalene dicarboxylic acid and at least one glycol selected from ethylene glycol, 1,4-butanediol and 1,4-cyclohexanedimethanol. Polyethylene terephthalate, which may be modified by small amounts of other monomers, is especially preferred. Polypropylene is also useful. Other suitable polyesters include liquid crystal copolyesters formed by the inclusion of a suitable amount of a co-acid component such as stilbene carboxylic acid. Examples of such liquid crystal copolyesters are those disclosed in U.S. Pat. No. 4,420,607, 4,459,402 and 4,468,510.

Curl of films made in accordance with the present invention may be measured by any acceptable method. One of such methods is that of the American National Standards Institute, Inc., New York, N.Y. 10018, U.S.A. It is Test Method A of ANSI PH1.29-1971, American National Standard Methods for Determining Curl of Photographic Film. As used in this specification, longitudinal curl is considered positive if the test sample curls concavely in the direction of its longitudinal movement during stretching and toward the side of the film in contact with the casting drum; and negative, if the test sample curls toward the opposite side of the film.

BRIEF DESCRIPTION OF THE DRAAWINGS

The foregoing and other objectives, features and advantages of the invention will be apparent from the following more particular description of the preferred embodiments of the invention, as illustrated by the accompanying drawings, in which:

FIG. 4 shows a plot of the change in ANSI curl as a function of the calculated temperature differential between the opposite sides of the cast sheet of FIG. 3.

DESCRIPTION OF THE PREFERRED EMBODIMENTS

Figure 1:
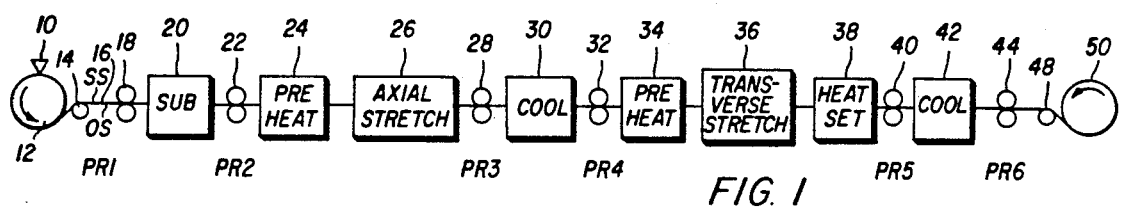
FIG. 1 shows schematically one type of apparatus useful for producing thermoplastic films in accordance with the invention.

The following is a detailed description of the preferred embodiments of the invention, reference being made to the drawings in which the same reference numerals identify the same elements of structure in each of the several figures.

FIG. 1 shows a schematic representation of an apparatus for producing biaxially oriented film in accordance with the invention. A conventional extruder 10 extrudes thermoplastic material in molten sheet form onto the exterior surface of a rotating, cooled casting drum 12 which rotates at a speed chosen to ensure that the sheet will have cooled and solidified sufficiently to facilitate its removal from drum 12 over a stripping roller 14. Extruder 10 preferably is provided with a narrow, flat die opening having bulbous ends (not illustrated) which cause the extruded sheet to have edge beads which facilitate its being restrained against necking in during longitudinal stretching and its being transversely stretched, as will be familiar to those skilled in the art. From roller 14, a cast sheet 16 is drawn through a set of pull rolls 18, which maintain a desired level of tension in cast sheet 16, and then into an optional treatment zone 20 where various subbing layers may be applied to cast sheet 16, depending on its ultimate intended use. The cast sheet is then drawn through a further set of pull rolls 22, which typically rotate at the same peripheral velocity as rolls 18, and into a preheat zone 24. In zone 24, infrared heaters or flows of heated air or some combination of the two may be used to raise the temperature of the cast sheet to a level just insufficient for plastic elongation to occur, typically 5 to 15 degrees Centigrade below the glass transition temperature Tg of the thermoplastic material. The preheated cast sheet then moves directly into a longitudinal or axial stretch zone 26 under the influence a further set of pull rolls 28 which are rotated at a peripheral velocity higher than that of pull rolls 22; so that, a stretching tension is applied to cast sheet 16 as it moves through preheat zone 24 and longitudinal stretch zone 26. For example, pull rolls 28 might operate at about three times the peripheral velocity of pull rolls 22. Within longitudinal stretch zone 26, the cast sheet is further heated to a temperature above its glass transition temperature Tg but below its crystallization temperature Tc, thus permitting stretching and molecular orienting of the material of the sheet to occur. As will be discussed with regard to FIGS. 2 to 4, such further heating is performed assymetrically; so that, a temperature differential exists across the thickness of the cast sheet from one surface to the other during and at the location of the actual longitudinal stretching thereof.

From pull rolls 28 the longitudinally oriented film formed by stretching cast sheet 16 is drawn through a cooling zone 30 where its temperature is lowered to less than Tg to prevent further stretching. The film is then drawn by pull rolls 32, rotating at the same peripheral velocity as pull rolls 28, into a preheating zone 34 and on into a transverse stretching or tentering zone 36 where the film is stretched transversely in the familiar manner. The biaxially stretched and oriented film then passes into a heat set zone 38 where its temperature is raised to approximately the crystallization temperature Tc. The residence time of the film within heat set zone 38 is chosen to ensure that the previously oriented molecules of the material are enabled to crystallize, causing desired densification of the material and improved mechanical properties. A set of pull rolls 40, rotating at the same peripheral velocity as pull rolls 32, delivers the film to a cooling zone 42, after which it passes through final pull rolls 44, over a guide roll 48 and onto a take up drum or reel 50.

Figure 2:
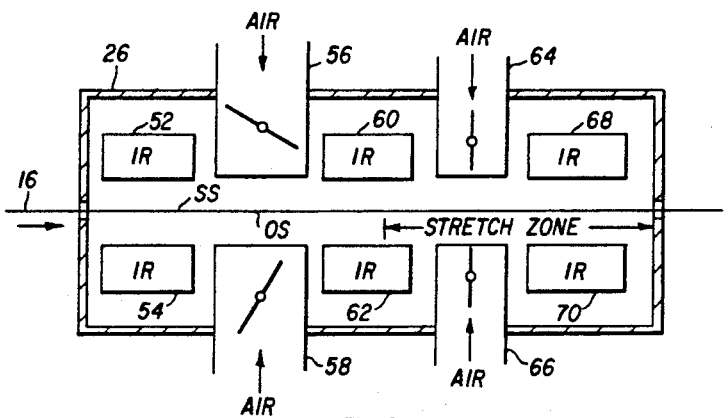
FIG. 2 shows schematically the longitudinal stretching zone of the apparatus of FIG. 1, illustrating various means for assymetrically heating the cast sheet during stretching.

FIG. 2 illustrates schematically the interior components of longitudinal or axial stretch zone 26, particularly those which may be used in accordance with the invention to ensure that the desired temperature differential exists across film 16 as it is being stretched longitudinally. As indicated previously, the temperature of the film entering zone 26 is somewhat below the glass transition temperature of the material, thus ensuring that substantially no molecular orienting takes place, even though the cast sheet is under considerable tension due to the differential peripheral velocities of pull rolls 22 and 28. As heat is applied to the cast sheet within zone 26, the temperature of the material is increased to a range between Tg and Tc, preferably substantially nearer to Tg. When the temperature of the material has been raised sufficiently, stretching and molecular reorientation occur, as will be familiar to those skilled in the art.

The necessary further heating of cast sheet 16 may be accomplished by flowing heated air over one or both of the surfaces of the sheet, by applying infrared heat of various wavelengths to one or both surfaces or by combinations of the two. Thus, FIG. 2 shows, just for example, a first pair 52, 54 of infrared heaters positioned oppositely on either side of sheet 16, followed by a pair of hot air ducts 56, 58 positioned oppositely on either side, followed by yet another pair of infrared heaters 60, 62 positioned oppositely on either side, another pair of hot air ducts 64, 66 positioned oppositely on either side and a final pair of infrared heaters 68, 70 positioned oppositely on either side. It is also within the scope of the invention to stagger the heaters so that they are not opposite each other; and to place air ducts across from infrared heaters, so long as the desired differential heating is achieved. By applying more heat to one side than to the other, a temperature differential is created across the thickness of the sheet while it is being longitudinally stretched. Depending on whether the temperature of the side SS which was in contact with casting drum 12 or that of the side OS which faced away from drum 12 is higher than the other, the resulting film may have positive, zero or negative curl, as will be discussed with regard to FIG. 3.

In one actual demonstration of the process according to the invention, polyethylene terephthalate thermoplastic material was extruded through a flat die to produce a flat cast sheet approximately 16 cm wide, 0.114 cm thick and having beaded edges. In its unoriented condition, the material had a Tg in the range of 75 to 85 degrees Centigrade. The sheet was uniformly preheated using infrared heaters to a temperature of about 65 to 75 degrees Centigrade in preheat zone 24 before entering axial or longitudinal stretch zone 26. Approximately 120 to 130 cm from the entrance to zone 26, hot air ducts were provided on either side of the sheet and extending across the width of the sheet, for flowing onto the sheet air having a temperature T in the range of 85 to 135 degrees Centigrade and a flow rate of approximately 3500 to 4000 liters per minute. The temperature of the air in each duct was individually controllable as was the air flow through each, thus permitting operation with air flow to one or both sides and with different air temperatures on each side. The peripheral velocity of pull rolls 22 was in the range of 0.030 to 0.032 m/sec; and that of pull rolls 28 was in the range of 0.10 to 0.32 m/sec. In heat set zone 38, the temperature of the oriented film was raised to the range of 195 to 205 degrees Centigrade, compared to its crystallization temperature Tc of the material in the range of 120 to 220 degrees Centigrade. The film was then cooled in zone 42 with air having a temperature in the range of 15 to 30 degrees Centigrade.

Figure 3:
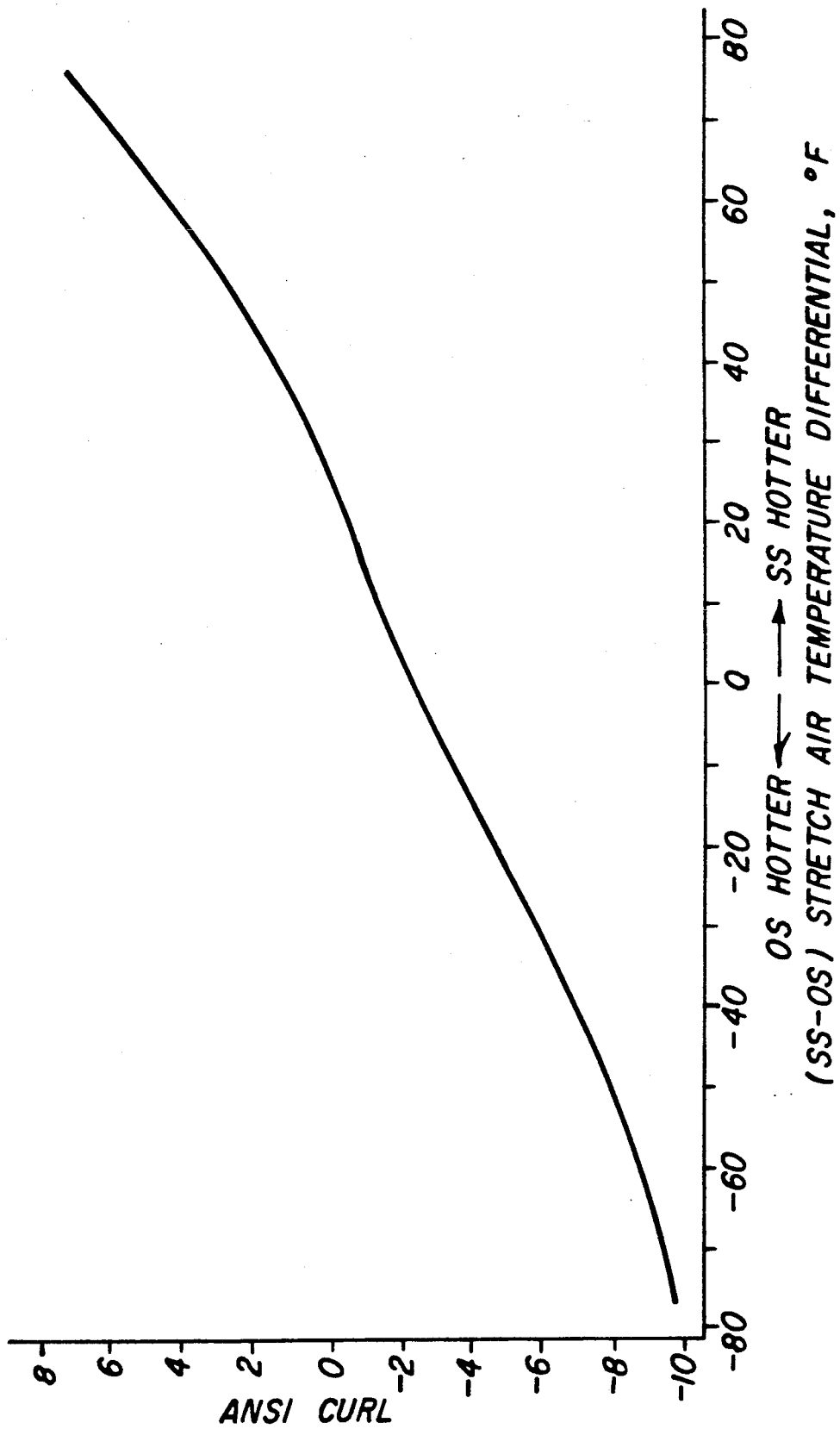
FIG. 3 shows a plot of the change in ANSI curl as a function of the temperature differential between flows of air directed to opposite sides of a cast sheet during stretching.

FIG. 3 shows how the ANSI curl of the resultant film varied as a function of the temperature differential in the hot air flowing onto the surface of the film as it was stretched. Depending on whether the OS or SS side was the hotter during stretching, it was possible to produce film having positive, zero or negative curl. Interestingly, as indicated in the Figure, a zero temperature differential in the air did not produce zero curl in the film, suggesting that there are other operating parameters which also affect curl. By mathematically modelling the conditions in the stretch zone, it was possible to calculate the approximate temperature differential across the thickness of the film during stretching, as shown in FIG. 4. The temperature of the film at each of its surfaces preferably was in the range of Tg to Tc.

Having thus described our invention in sufficient detail to enable those skilled in the art to make and use it, we claim as new and desire to secure Letters Patent for:

1. A process for making molecularly oriented films of thermoplastic orientable materials, such films having a desired amount of longitudinal curl, said process comprising the steps of:
    extruding molten thermoplastic orientable material through a flat die to produce a cast sheet of such material, said cast sheet having a longitudinal axis, a width transverse to said axis and a thickness transverse to said width and said axis;
    cooling said cast sheet;
    preheating said cast sheet to increase its temperature to a level insufficient for plastic elongation to occur;

molecularly orienting said cast sheet by stretching it longitudinally while further heating it, during and at the location of said stretching, to a temperature above its glass transition temperature Tg but below its crystallization temperature Tc, said further heating being performed assymetrically so that a temperature differential exists across said thickness of said cast sheet from one surface to the other during and at the location of said stretching;

following said stretching, cooling the film formed by said stretching to a temperature below Tg to prevent further stretching; and heat setting said film at a temperature substantially equal to Tc.

2. The process according to claim 1, further comprising the step of molecularly orienting said cast sheet by stretching it transversely while also heating it above Tg, prior to said heat setting step.

3. The process according to claim 1, wherein said heating is accomplished by directing a flow of heated gas against at least one surface of said cast sheet.

4. The process according to claim 1, wherein said heating is accomplished by exposing at least one surface of said cast sheet to infrared radiation.

5. The process according to claim 1, wherein said cooling is accomplished by directing a flow of cooled gas against at least one surface of said film.

6. The process according to claim 1, wherein said preheating is accomplished by exposing at least one surface of said cast sheet to infrared radiation.

7. The process according to claim 1, wherein said further heating is accomplished by exposing at least one surface of said cast sheet to a combination of infrared radiation and heated gas.

8. The process according to claim 1, wherein during said stretching the temperature of each surface of said cast sheet is in the range of Tg to Tc.

9. The process according to claim 1, wherein said thermoplastic orientable material is polyethylene terephthalate.

10. The process according to claim 1, wherein said stretching is accomplished by passing said cast sheet through a first set of pull rolls rotating at a first velocity and then through a second set of pull rolls rotating at a higher velocity, whereby said stretching and said further heating steps are performed between said first and second sets of pull rolls.

* * * * *